UNITED STATES PATENT OFFICE.

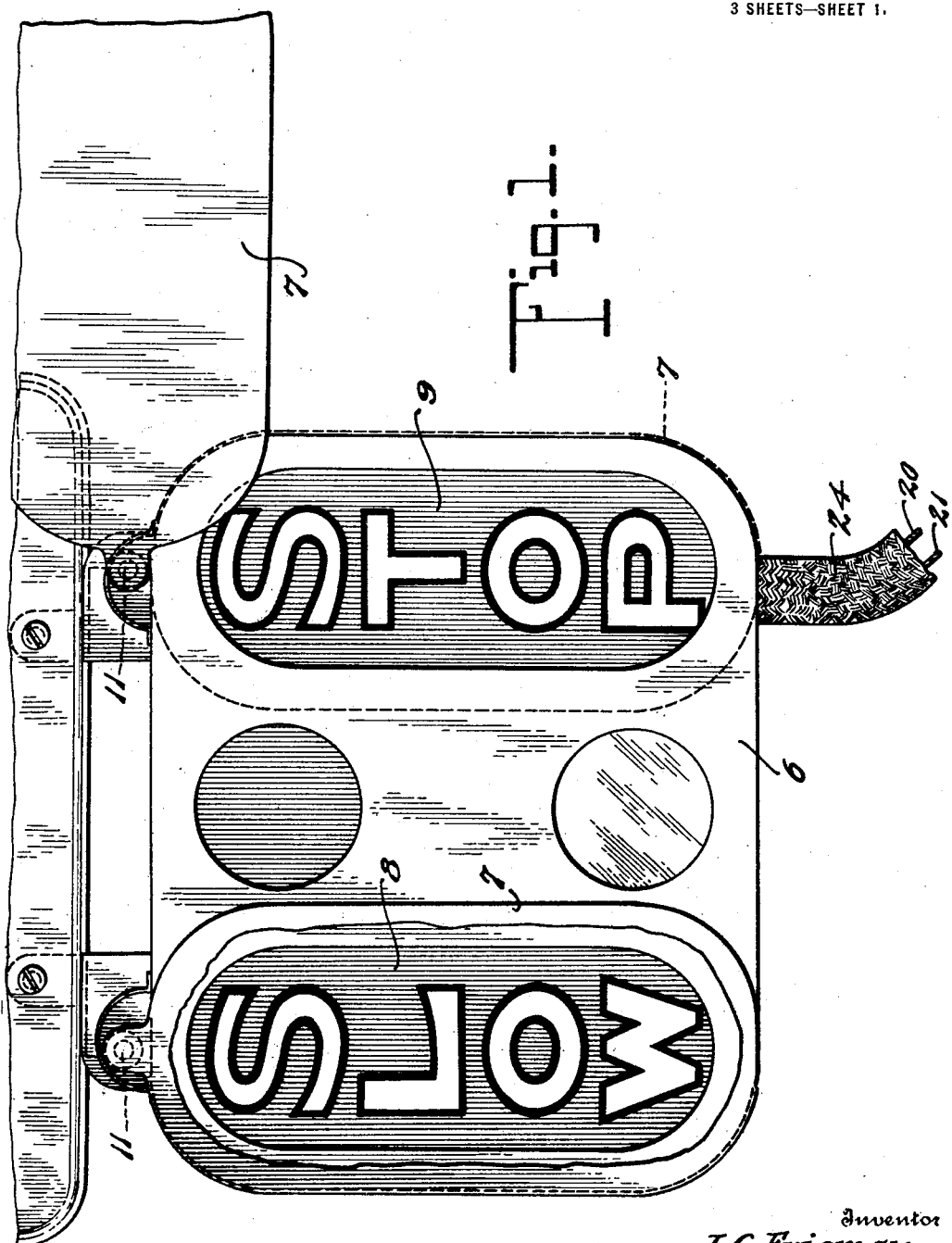

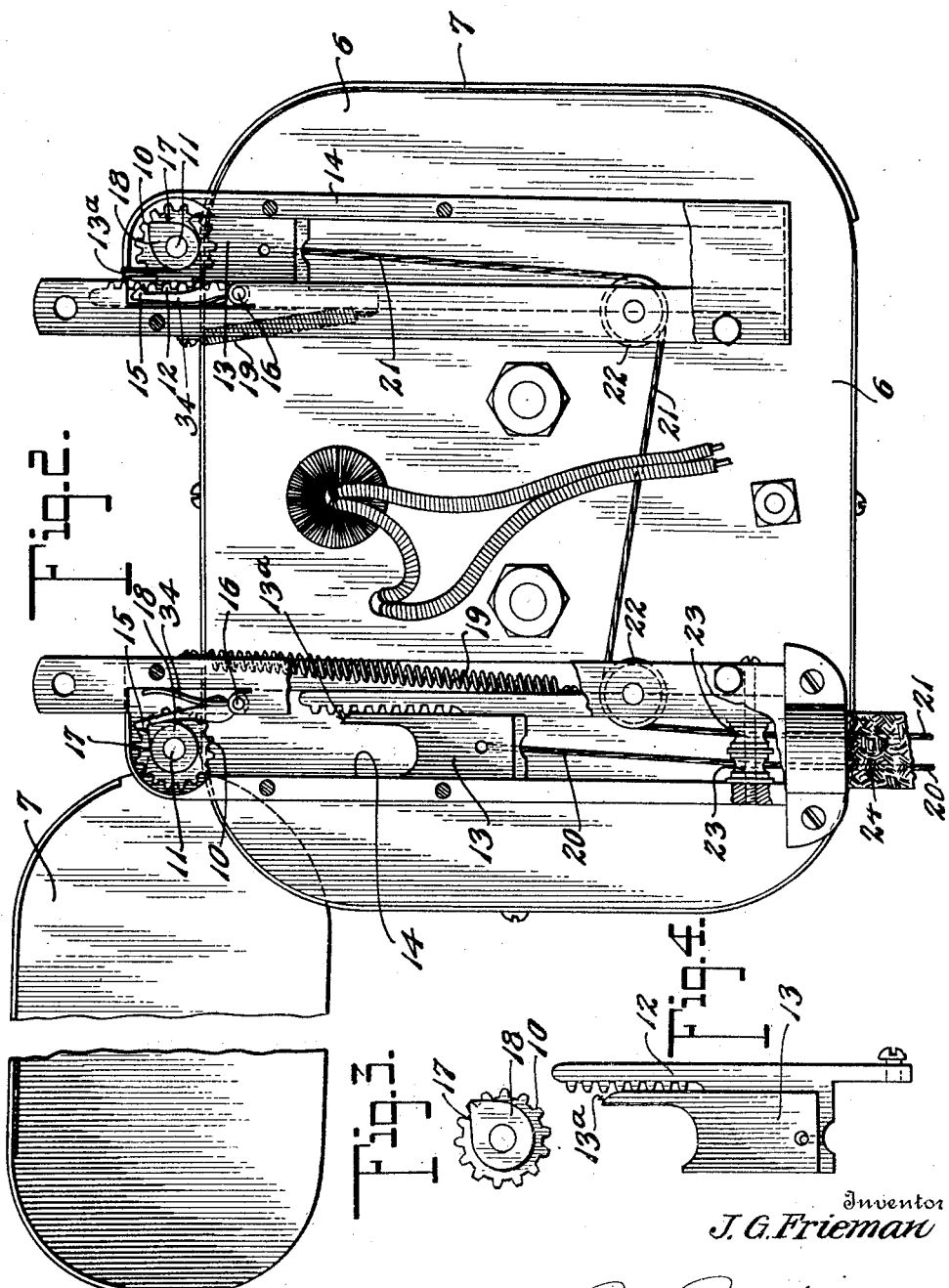

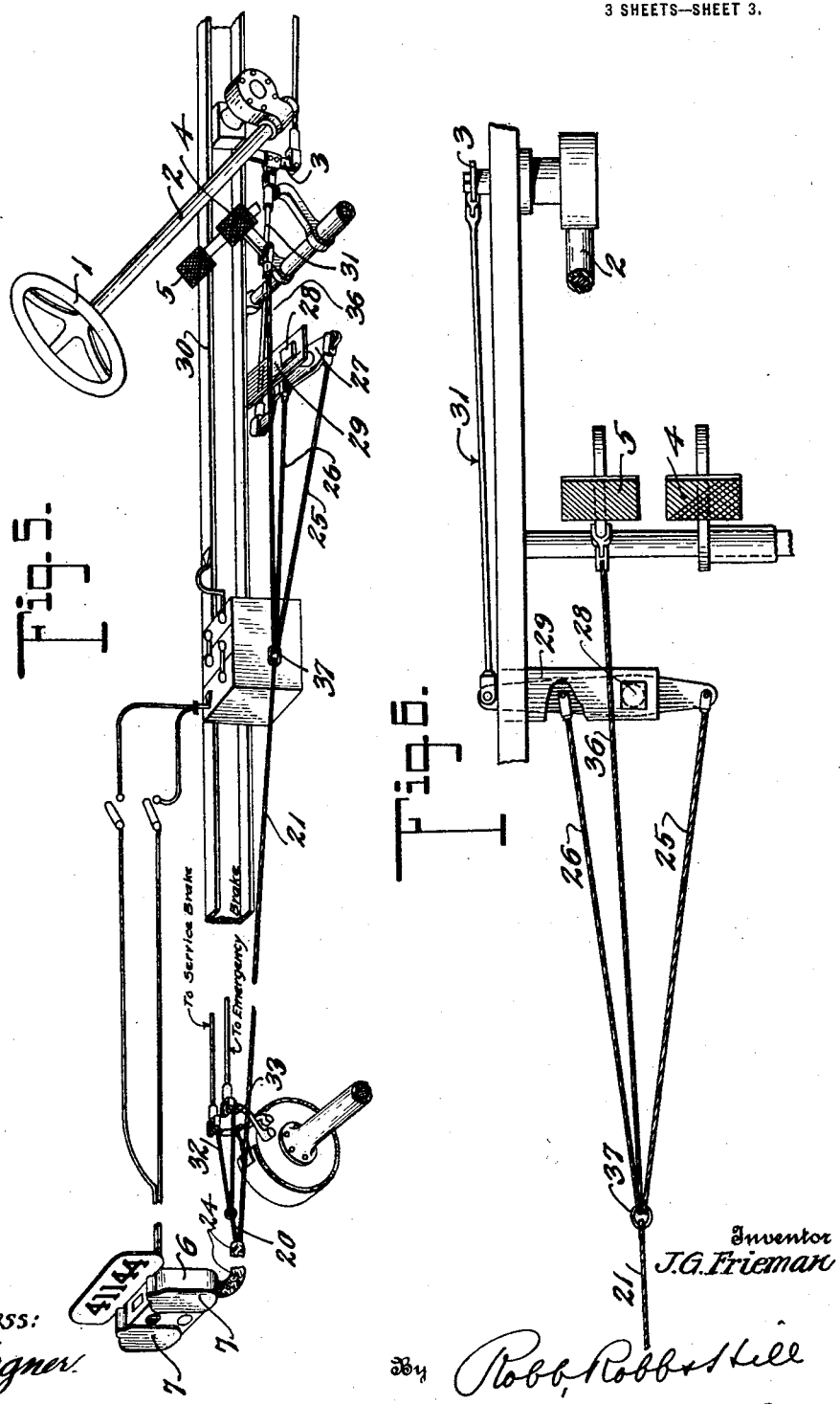

JACOB G. FRIEMAN, OF CHICAGO, ILLINOIS.

VEHICLE-SIGNAL.

1,399,339.  Specification of Letters Patent.  Patented Dec. 6, 1921.

Application filed December 28, 1920. Serial No. 433,643.

*To all whom it may concern:*

Be it known that I, JACOB G. FRIEMAN, a citizen of the United States, residing at Chicago, in the county of Cook and State of Illinois, have invented certain new and useful Improvements in Vehicle-Signals, of which the following is a specification.

The present invention involves certain improvements in the signaling device of my application for patent, Serial No. 279,123, filed February 25, 1919, and pertains particularly to new provisions made by me for operating certain cover members utilized as concealing means for normally maintaining out of view visual word signals. The cover means comprises a plurality of covers operable one by the brake mechanism of the machine, and the other by the clutch and steering instrumentalities of a motor vehicle. The new provisions devised for the operation of the cover members includes means for temporarily maintaining the covers or cover members in open positions after initial actuation thereof and irrespective of further operation of the main operating means by which the movement of the cover members is primarily effected; the said operating means being adapted to cause a release of the cover members when the clutch or brake or steering instrumentalities are restored to normal, and thus the covers will be permitted to return to their normal closed positions concealing the visual or other word signal. In the accompanying drawings:

Figure 1 is a rear view of a signaling device embodying the invention, one of the concealing covers for the "slow" signal being broken away and the other cover, that for the "stop" signal, being shown in open or actuated position.

Fig. 2 is a rear view looking toward the front side of the signal box, showing one of the operating means for a concealing cover in operated condition, the other operating means being in its normal position.

Fig. 3 is a view of the combined gear and cover holding flat or cam.

Fig. 4 is a view in elevation of the combined rack and latch release cam.

Fig. 5 is a general perspective view to bring out more clearly the arrangement of the signal box on the frame and the operative connections between the clutch and service brake pedals and the emergency brake lever, and the parts of the mechanism in the signal box.

Fig. 6 is a fragmentary plan view of certain of the parts shown in Fig. 5.

The general mechanical details of the signaling mechanism will now be treated upon reference to Figs. 1 to 6, inclusive. As shown in Fig. 5, certain of the customary motor vehicle parts are connected up with the signaling device and include the steering wheel 1 with its steering column 2 and connected as seen in Fig. 6 with the steering arm 3. There are also provided the customary service brake pedal 4 and clutch pedal 5 which are used to operate the signal somewhat after the manner as set forth in my previous application herein identified. The signaling device proper is located at the rear end of the vehicle and comprises a box 6 containing an audible signal in the nature of a bell, visual signals in the nature of "slow" and "stop" warnings adapted to be illuminated at night by suitable lights, and a constantly operating danger signal consisting preferably of a red light intermittently flashed whenever the brakes of the vehicle are applied, either the service or emergency brake as the case may be.

Certain novel operating devices are employed for the actuation of the covers 7 mounted on the back of the box 6 and adapted to be moved from vertical to horizontal positions to expose the visual signals comprising in one instance the word "slow", or its equivalent, and in the other instance the word "stop", or its equivalent, see Fig. 1. As shown best in Figs. 1 to 4, inclusive, the means for moving each of the cover members or covers 77 by which the signal "slow", designated 8, and the signal "stop", designated 9, may be exposed to view, comprises a pinion 10 mounted on the shaft 11 which forms the axis and support for the adjacent cover 7. Mounted in suitable guiding means on the back of the box 6 is a rack 12 having an integral or attached cam 13 movable therewith, the rack being capable of engaging, and indeed normally engaging, the teeth of the pinion 10, as seen at the right in Fig. 2. Supported near the guiding means 14 for the rack and cam parts aforesaid is a latch pawl 15 pivoted at 16 and arranged to engage a flat 17 on one side of a detent 18, one of which is provided on one of the shafts 11 and another of which is provided on the other of said shafts, said shafts operating to close certain contacts controlling electric circuit connections for lights and audible signals forming a part of the mechanism within the box 6. Connected with each one of the racks 12 is a spring 19 normally tending to upraise the rack to maintain it in the normal position shown at the right side of Fig. 2, a rack in actuated or abnormal position being illustrated at the left in Fig. 2.

There are connected with each of racks 12 cables or flexible operating connections 20 and 21, the cable 21 with the rack which operates the "slow" signal cover 7 and the cable 20 with the rack which operates the "stop" signal cover. The cable 21 passes around grooved rollers 22 and over a guiding groove roller 23, two of which are provided for the respective cables at a point near the lower end of the box 6. From the rollers 23 the cables 20 and 21 pass into a flexible housing or tube 24 from which they emerge and are connected with the operating parts at the rear and front of the machine, in the following manner:

The "slow" signal cable 21 extends from the tube 24 forwardly to a point of connection with divergent cables 25 and 26, the front ends of which are connected with portions of a lever 27 on opposite sides of the axis 28 for said lever. The lever 27 is mounted on a bracket 29 suitably secured to the frame or chassis 30 of the vehicle. The lever 27 is connected at its outer end by a rod 31 with the steering arm 3 adapted to be operated in the usual way by the steering wheel.

The cable 20 passes from the tube 24 and is connected with a cable 32 which is attached to the service brake operating means at the rear wheels of the vehicle. A second cable 33 attached to the emergency brake control means at the rear wheels is adapted to operate the "stop" signal 9 whenever the emergency brake lever is operated to stop the vehicle. The method of making the connections 32 and 33 with the brake operating parts on the rear axle of the motor vehicle eliminates the necessity for carrying the connections forward to the service brake pedal and the emergency brake lever.

With the above general understanding of the arrangement of the mechanical operating devices for the cover 7 of the "slow" and "stop" signals, and with the suggestion that springs 34 are used to normally push the latch pawls 15 into engagement with the flat 17 of the detent 18, an understanding of the operation of opening and closing the covers 7 may be had.

Supposing the operator turns to the right or left through actuation of his steering wheel 1. The movement of the steering shaft will be imparted to the steering arm 3, see Fig. 6, and will rock the lever 27 on the bracket 29, either one way or the other. In either event, one of the connections 25 and 26 will be operated to pull upon the connection 21, thereby pulling down the rack 12 and its cam 13. These parts are illustrated at the right in Fig. 2, and would be pulled to the positions which the corresponding parts have assumed as shown at the left of Fig. 2, thereby causing actuation of the pinion 10 to throw the cover 7 at the right in Fig. 2 into open position. When the cover 7 has reached its open position the latch pawl 15 engages the flat 17 of the adjacent detent 18 and temporarily locks the cover in such open position, even after the rack leaves its engagement with the teeth of the adjacent pinion 10. The cover 7 of the "slow" signal, designated 8, is exposed to view and becomes operative and stays operative as long as the vehicle is turning. When the steering gear resumes its normal position for straight or forward movement of the vehicle, the pull upon the cable 21 is relieved and the spring 19 restores the rack 12 and its cam 13 to the normal position at the right of Fig. 2. In this operation the cam 13 comes into play by its nose 13ª engaging the latch pawl 15, to disengage the latch pawl from the flat 17 of the detent 18, thereby causing a release of the detent, its shaft 11 and the cover 7 connected to move with said shaft, permitting the cover to resume its normal closed position.

Whenever the clutch pedal 5 is operated, by reason of its cable connection 36, with a ring or similar device 37 connecting the cables 26, 25 and 21 together, a pull is exerted on the cable 21 to cause operation of the cover 7 of the "slow" signal 8 in precisely the same manner as said cover is operated by the lever 27 under the influence of movement of the steering gear. The clutch 5 is rarely thrown out save when a slowing down or stopping of a vehicle is desired or being prepared for, and hence it is desirable that the "slow" signal 8 be made operative upon actuation of the clutch pedal 5 as well as upon turning movements of the vehicle.

Of course when the service brake 4 is operated, or the emergency brake lever, the connections 32 and 33 attached to the cable 20 will be operated, either one or both, depending upon the independent or simultaneous operation of the brakes, thus causing the "stop" signal 9 to become operative through the opening of its cover 7 in an obvious manner.

In effect, the means which I use to hold my cover members 7 locked temporarily in open positions avoids the necessity of utilizing intermediate the covers and the manual parts by which their operation is initiated, some special movement reducing contrivances, doing away with possibly unreliable spring connections, and affords other advantages of a clearly obvious nature.

Having thus described my invention, what

I claim as new and desire to secure by Letters Patent is:

1. In a signaling device, the combination of a signal box, a signal therein, a cover for said signal, means for positively actuating said cover to open the same, latch means to temporarily lock the cover in open condition, and means for releasing the latch means.

2. In a signaling device, the combination of a signal box, a signal therein, a cover for said signal, means for positively actuating said cover to open the same, latch means to temporarily lock the cover in open condition, and means for releasing the latch means arranged to be operated by the means which opens the cover.

3. In a signaling device, the combination of a signal box, a signal therein, a cover for the signal, means to open said cover, latch means to lock the cover open, and means to operate the latch means incident to normalizing action of the cover opening means.

4. In a signaling device, the combination of a signal, a cover therefor, means to open said cover, means to lock the cover temporarily open, and means to unlock or release the cover as an incident to the normalizing action of the opening means aforesaid.

5. In a signalizing device, the combination of a signal, a cover therefor, actuating means adapted to be manually operated for moving said cover to open position, means for automatically returning said actuating means to normal condition when released, means carried in part by said cover for automatically latching the latter in open position, and means carried by said actuating means for tripping said latching means as an incident to the return of said actuating means to normal condition.

6. In a signaling device, the combination of a support, a cover member thereon, means to open the cover member comprising a rack and pinion device, a latch pawl to lock the cover open, and means intermediate the rack pinion device and latch pawl to release the cover from the latter.

7. In a signaling device, the combination of a signal, a cover therefor, an operating rack, a pinion connected with the cover and operated by the rack, a latch to hold the cover open when operated by the rack, and means to trip the latch incident to return movement of the rack after actuation.

8. In a signaling device, the combination of a signal, a cover therefor, means to operate said cover comprising a rack, a pinion connected with the cover and engaging the rack, a detent connected with the cover, a latch pawl to engage the detent and hold the cover open after it has been actuated by the rack, and a cam on the rack for tripping and releasing the latch pawl on return of the rack to normal position after actuation, whereby to prevent closing of the cover.

In testimony whereof I affix my signature.

JACOB G. FRIEMAN.